United States Patent Office
2,859,679
Patented Nov. 11, 1958

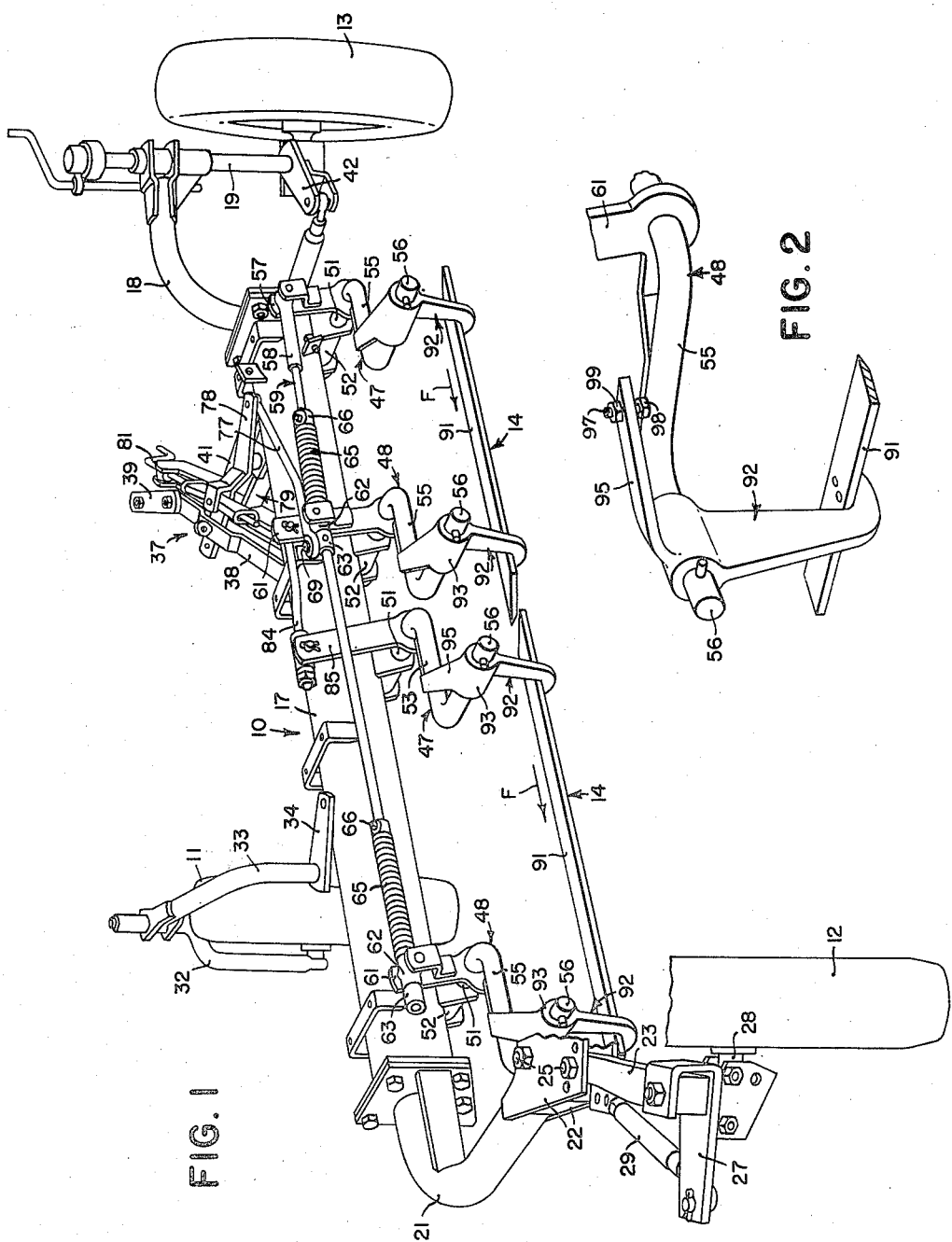

2,859,679
WEEDER

Robert H. Macfarlane, Welland, Ontario, Canada, assignor to John Deere Plow Company (Limited), Welland, Ontario, Canada, a corporation of Canada Application April 18, 1955, Serial No. 502,088
5 Claims. (Cl. 97—144.1)

The present invention relates generally to agricultural implements and more particularly to subsurface cultivators in the form of weeders of the type having fixed elongated blades that are drawn along the ground just under the surface thereof for the purpose of killing plant growth but leaving the stubble more or less undisturbed.

The object and general nature of the present invention is the provision of a subsurface cultivator in the form of a weeder having a plurality of elongated blades flexibly carried on a supporting frame or other suitable means and so constructed and arranged as to follow the surface of the ground although the latter may be rolling or uneven. More specifically, it is a feature of this invention to provide a subsurface cultivator in the form of a blade weeder having a plurality of elongated blades supported for generally independent movement but arranged so that one end of each blade will be constrained to follow any generally up-and-down movement of the contiguous end of the adjacent blade. It is a further feature of this invention to provide a weeder blade attachment for a wheeled support of the type having pivotally mounted, blade-receiving arms so constructed and arranged as to provide for up-and-down movement of the weeder blades so as to permit the same to follow undulations in the ground surface. An additional feature is the provision of means cooperating with the associated blade-carried swingable arms for limiting the downward movement of the blades relative to the supporting frame.

These and other objects and advantages of the present invention will be apparent to those skilled in the art after a consideration of the following detailed description, taken in conjunction with the accompanying drawings, in which:

Fig. 1 is a perspective view taken from the rear of a machine incorporating the principles of the present invention and in which a plurality of blade-weeder units forming a blade-weeder attachment are shown as connected with a support in the form of a wheel frame having means for individually receiving the ends of the several blades and accommodating their individual movement relative to the supporting frame so as to permit them to follow undulations in the ground surface.

Fig. 2 is a perspective view of the adjustable depth-regulating means incorporated in the blade weeder of the present invention.

The implement of the present invention is shown as incorporated in a weeder that comprises a supporting frame 10 carried on a land wheel 11 and a pair of furrow wheels 12 and 13, and a plurality of weeder units 14. The supporting frame 10 comprises a supporting or frame member in the form of a generally diagonally arranged pipe 17, at one end of which is a front furrow wheel supporting bracket 18 to which the spindle 19 carrying the front furrow wheel 13 is connected for lateral or steering movement and also for generally vertical adjustment. At the other end of the frame member 17, there is a rear furrow wheel supporting bracket 21 that includes a pair of plate sections 22 to which an axle bar 23 is connected. The axle bar is disposed between the plate sections 22 and is held in different adjusted positions by clamping bolts 25. The rear end of the axle bar 23 receives a rear wheel bracket 27 which adjustably receives the spindle 28 of the rear furrow wheel 12, the bracket 27 being held in different positions of adjustment by a turnbuckle link 29 connected between the bar 23 and the bracket 27. By virtue of this adjustment, the amount of lead of the rear furrow wheel 12 may be varied, as desired, or as required by different soil conditions or other factors. The land wheel 11 is journaled for rotation on a spindle 32 that is carried in a land wheel bracket 33 for castering movement, the rear portion of the bracket 33 being fixedly connected, as by an adjustable arm 34, with the frame pipe 17.

The supporting frame structure 10 is adapted to be connected with a propelling tractor by a draft structure 37 that comprises a generally fore-and-aft extending drawbar 38, to the forward end of which a steering arm 39 is pivoted. The lower portion of the latter is connected in any suitable way with a steering link 41 that extends rearwardly and laterally and is connected to a steering arm 42 that is fixed to the front furrow wheel spindle 19.

A plurality of pairs of implement-receiving arms are swingably connected with the frame 10. The forward or right-hand arm of each pair is indicated by the reference numeral 47, and the rear arm of each pair is indicated by the reference numeral 48. Each of these arms is the nature of a generally Z-shaped member having a forward or right-hand section 51 rockably mounted in a bearing sleeve section 52 that is fixed in any suitable way to the lower side of the frame member 17. Each of the arms 47 and 48 also includes a generally horizontally directed section 55 and a generally rearwardly directed section 56. Mounted on the forwardmost arm 47 is an arm extension 57 arranged generally vertically and pivotally receiving the forward or right-hand end of the adjusting sleeve section 58 of an operating link 59. Mounted on each of the swingable arms 48 is a vertically extending arm section 61, each carrying a pivoted swivel 62 through which the rod member 59 extends. The rod member 59 carries a set screw collar 63 immediately rearwardly, or to the left, of the associated swivel member 62, and on the other side of each of the swivels 62 is a compression spring 65, the forward or right-hand end of the latter bearing a set screw collar 66 that is adjustably fixed to the operating rod 59. The forward or right-hand set screw collar 63 carries a pivot 69 that receives the rear or left end of a link 77, the forward end of which is connected to an arm 78 that is swingably mounted on a bracket 79 fixed to the pipe member 17. Also mounted on the bracket 79 is an operating member in the form of a screw crank 81 which is connected to swing the lever 78 in one direction or the other, thus acting through the link 77 to shift the operating rod 59 generally longitudinally of the frame member 17. The crank screw 81 also serves as means for adjustably holding the link 59 in any position of adjustment. The arm 61 on the intermediate arm member 48 is connected by a link 84 to a vertically extending arm section 85 that is fixed to the intermediate implement supporting arm 47, which lies immediately adjacent the arm 48 that carries the vertical arm extension 61 just mentioned. The link 84 and associated parts thus serve to cause the intermediate arms 47 and 48 to swing together.

A supporting frame structure of this character is disclosed and claimed in U. S. Patent 2,669,171, issued February 16, 1954, to W. H. Silver et al., being shown in said patent as a part of a disk tiller. According to the present invention, a frame structure of this kind is employed as a part of a blade weeder by mounting on the arms 47 and 48 a plurality of blade-weeder units 14, there being as many blade weeder units 14 as there are pairs of arms 47 and 48. For the purposes of illustrating the principles of the present invention, only two pairs of arms and blade-weeder units are disclosed, but it is to be understood that more than two pairs of arms and two blade-weeder units may be employed, if desired.

Each blade-weeder unit comprises an elongated weeder blade 91 and a standard 92 fixed to each end of each blade 91. The standards 92 extend generally vertically, and the upper portion of each is carried or is formed with a bearing sleeve section 93 that rockably receives the rearwardly extending sections 56 of the associated implement-receiving arms 47 and 48. Each bearing sleeve section carries a forward extension 95 that overlies the intermediate portion 55 of the associated supporting arms 47 and 48. These extensions 95 cooperate with the arms to resist any tendency for the blade standards 92 to turn on the associated arms 47 and 48 and, in addition, the arms serve as depth regulating means. As will best be seen from Fig. 2, each of the arms or extensions 95 carries a set screw 97 having a head 98 normally in engagement with or adapted to engage the central portion 55 of the associated bail arm 48. The set screw 97 is threaded into a tapped opening in the extension 95, and a jam nut 99 on the upper portion of the set screw 97 acts to hold the latter in the desired position of adjustment. When the head 98 contacts the bail arm 48, it thus determines the maximum depth at which the blade 14 is permitted to reach.

In operation, the weeder blades or knives 91 are drawn through the ground at a maximum depth of operation that is determined by the adjustment of the set screws 97. The amount of down pressure exerted against the bail arms 48 by the springs 65 is determined by the adjustment of the operating or controlling rod member 59, the position of which is adjusted by the crank screw 81. The rear or left-hand end of the rearmost unit 14 may move upwardly, as when an obstruction or the like is encountered, by the yielding of the rear spring 65, and the adjacent ends of the two blades or knives 91 may also move up, being constrained to move together by the link 84, by the yielding of the forward spring 65 thereby tending more or less to follow surface irregularities while operating at generally uniform depth. The extensions 95 and the set screws 97 serve the important purpose of substantially relieving the blades 14 of bending stresses that might otherwise occur under the influence of the force F (Fig. 1), acting rearwardly along the blades 14 by the soil pressure thereagainst in operation, if the standards 92 were permitted to rock about the axes defined by the bail arm rear portions 56. Thus, the connections between the blades 91 and the lower ends of the standards are required to resist principally only sheer forces and are not required to resist any tendency for the standards to turn at the lower ends relative to the blades. Both or all blade units 14 may be raised into a transport position by turning the crank screw 81 in the direction to shift the controlling rod 59 in a right-hand direction.

What I have shown and described above, the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

1. In an agricultural implement, the combination with an elongated supporting member, a pair of generally horizontally disposed arms pivoted to and extending generally longitudinally of said supporting member, each of said arms having generally rearwardly extending portions, and means acting between said member and said arms to raise and lower the latter, of an elongated ground engaging weeder blade extending generally longitudinally of said supporting member and disposed below the latter, blade connecting means comprising a pair of generally vertical standards fixed at their lower ends to said blade and each having at its upper portion a sleeve section rockably receiving the associated rearwardly extending arm portion, and a generally forwardly extending part on each sleeve section disposed so as to engage an adjacent portion of the associated arm to limit the movement of said blade in one direction.

2. In an agricultural implement, the combination with a wheeled frame and a pair of spaced apart arms swingably mounted on said frame and disposed in a generally horizontal plane generally parallel with said frame, a pair of generally vertical standards journaled at their upper ends on the outer ends of said arms, a weeder blade carried by the lower ends of said standards extending generally forwardly therefrom to a point over said generally horizontal arms, and extensions on said standards extending generally forwardly therefrom to a point over said generally horizontal arms and engageable with said arms to limit the swinging of said blade.

3. In an agricultural implement, the combination with a wheeled frame and a pair of spaced apart arms swingably mounted on said frame and disposed in a generally horizontal plane generally parallel with said frame, a pair of generally vertical standards journaled at their upper ends on the outer ends of said arms, a weeder blade carried by the lower ends of said standards, extensions on said standards engageable with said arms to limit the swinging of said blade, and adjustable abutments carried on said extensions and adapted to directly contact adjacent portions of said swingably mounted arms for limiting the depth of operation of said weeder blade.

4. In an agricultural implement such as a weeder of the type including an elongated support and a pair of spaced apart arms rockably carried thereby, each of said arms including a first portion extending generally transversely relative to the vertical plane of said support and a second portion lying in a plane parallel to said vertical plane, the improvement comprising an elongated weeder blade, a generally vertical standard fixed to each end of said blade, a sleeve section carried by each standard, each sleeve section extending transversely relative to said plane and receiving the associated rockable arm, and an abutment on each sleeve section extending generally laterally outwardly therefrom in a position to engage and serve as a stop to receive the associated second arm portion.

5. In an agricultural implement, the combination with an elongated supporting member normally carried in a generally diagonal position relative to the direction of travel, a pair of generally horizontally disposed arms pivoted to and extending generally longitudinally of said supporting member, each of said arms having generally rearwardly extending portions, and means acting between said member and said arms to raise and lower the latter, of an elongated ground engaging weeder blade extending generally longitudinally of said supporting member and disposed below the latter and generally parallel thereto, whereby soil pressure acting against the blade in operation subjects the latter to a displacing force directed generally along the blade, blade connecting means comprising a pair of generally vertical standards fixed at their lower ends to said blade and each having at its upper portion a sleeve section fixed to the standard and rockably receiving the associated rearwardly extending arm portion, and means connected rigidly with said sleeve sections to prevent rocking displacement thereof and thereby relieve the blade of binding stresses at the junctures between the blade and said standards.

References Cited in the file of this patent
UNITED STATES PATENTS

| | | |
|---|---|---|
| 841,708 | McClure | Jan. 22, 1907 |
| 1,251,324 | Bateman | Dec. 25, 1917 |
| 1,588,230 | Howell | June 8, 1926 |
| 2,450,236 | Hoffman | Sept. 28, 1948 |
| 2,669,171 | Silver et al. | Feb. 16, 1954 |

UNITED STATES PATENT OFFICE
CERTIFICATE OF CORRECTION

Patent No. 2,859,679 November 11, 1958

Robert H. Macfarlane

It is hereby certified that error appears in the printed specification of the above numbered patent requiring correction and that the said Letters Patent should read as corrected below.

Column 3, line 58, for "What" read -- While --; column 4, lines 15, 16 and 17, strike out "extending generally forwardly therefrom to a point over said generally horizontal arms".

Signed and sealed this 3rd day of February 1959.

(SEAL)
Attest:

KARL H. AXLINE
Attesting Officer

ROBERT C. WATSON
Commissioner of Patents